United States Patent [19]

Wollar et al.

[11] Patent Number: 4,610,587

[45] Date of Patent: Sep. 9, 1986

[54] REUSABLE TWO-PIECE FASTENER

[75] Inventors: Burnell J. Wollar, Barrington, Ill.; Richard J. Schwind, Akron, Ohio

[73] Assignee: Phillips Plastics Corporation, Phillips, Wis.

[21] Appl. No.: 838,191

[22] Filed: Mar. 7, 1986

Related U.S. Application Data

[63] Continuation of Ser. No. 565,534, Dec. 27, 1983, abandoned.

[51] Int. Cl.$^4$ ............................................. F16B 13/06
[52] U.S. Cl. ........................................ 411/60; 411/45; 411/59; 411/182
[58] Field of Search ...................... 411/15, 21, 22, 40, 411/43–48, 55–62, 71–73, 78, 182, 337, 352, 353, 512; 24/297, 453

[56] References Cited

U.S. PATENT DOCUMENTS

| | | | |
|---|---|---|---|
| 3,411,397 | 11/1968 | Birmingham | 411/41 |
| 4,082,030 | 4/1978 | Erickson | 411/15 |
| 4,174,008 | 11/1979 | Preziosi et al. | 411/353 |
| 4,263,833 | 4/1981 | Loudin et al. | 411/51 |
| 4,311,421 | 1/1982 | Okada et al. | 411/59 |
| 4,367,995 | 1/1983 | Mizusawa et al. | 411/437 |
| 4,391,559 | 7/1983 | Mizusawa | 411/41 |
| 4,435,111 | 3/1984 | Mizusawa | 411/21 |
| 4,460,298 | 7/1984 | Solarz et al. | 411/15 |

Primary Examiner—Gary L. Smith
Assistant Examiner—Neill Wilson

Attorney, Agent, or Firm—James E. Nilles; Thomas F. Kirby

[57] ABSTRACT

A reusable two-piece fastener for releasably securing together a plurality of panels which have aligned apertures therethrough comprises a body member and an associated externally threaded screw member. The body member, which is molded of resiliently flexible compressible plastic, comprises a head at one end radially expandable/retractable legs at the other end. A cylindrical bore extends inwardly from the head end of the body member. Screw-engaging internal female threads are integrally formed on the bore wall and are arranged in axially spaced apart sets therealong, each set including a plurality of thread sections, each of which sections extends around only a part of the circumference of the bore. These female threads are resiliently movable radially outwardly either because they are inherently compressible and flexible (one embodiment) or because they are formed on outwardly swingable bore wall portions (another embodiment). The screw member is axially and slidably insertable into the bore past the outwardly movable female screw-engaging threads to effect leg expansion and entrap the panels between the expanded legs and the body head. After such insertion, the female screw-engaging threads operatively engage the externally threaded screw member to permit only rotational removal thereof. Preferably, the thread on the screw member is discontinuous to prevent complete withdrawl of the screw member from the body bore.

1 Claim, 21 Drawing Figures 4,610,587

REUSABLE TWO-PIECE FASTENER

This application is a continuation, of application Ser. No. 565,534, filed 12/27/83, now abandoned.

BACKGROUND OF THE INVENTION

1. Field of Use

This invention relates generally to a reusable two-piece fastener, comprising a hollow expandable/retractable body member and an associated externally threaded screw member, for releasably securing together a plurality of panels which have aligned apertures therein.

In particular, it relates to a body member of the aforesaid character which has a bore therein and resilient outwardly movable screw-engaging threads formed in the bore which accommodate axial sliding insertion of the screw member during body member expansion and then operatively engage the screw member to require rotational removal thereof during body member retraction.

2. Description of the Prior Art

U.S. Pat. Nos. 4,311,421 and 4,367,995 each disclose a fastener of the aforesaid character and each employs integrally formed screw-engaging projections on the wall of the bore of the body member to allow axial sliding insertion of the associated screw member which effects body leg expansion while requiring rotation of the screw member to effect its removal. This arrangement enables the two associated parts of the fastener (body member and screw member) to be conveniently fastened together prior to use so as to be readily available for use. However, the prior art screw-engaging projections which are constructed to enable axial screw insertion are relatively diminutive in size and fragile and do not ensure tight engagement between the body member and the screw member or tight securement of the panels. As a result, relatively small axial forces can cause axial separation of the two parts.

SUMMARY OF THE INVENTION

In accordance with the invention there is provided an improved reusable two-piece fastener for releasably securing together a plurality of panels which have aligned apertures therethrough. The two-piece fastener comprises a body member and an associated screw member having an external male screw thread. The body member, which is molded of resiliently flexible compressible plastic, comprises a shank having a head or flange at one end and radially expandable/retractable legs at the other end, which legs are separated by longitudinal slots and hingedly interconnected at their free ends by an integrally formed hinge portion. A cylindrical bore extends inwardly from the head end of the body member through the head and into the shank and communicates with the slots. A leg-expander ramp or surface is provided on the inner surface of each leg. Screw-engaging internal female threads are integrally formed on the wall of the bore and are resiliently movable radially outwardly from an initial position; such outward movement being possible in one embodiment because of the inherent compressibility of the female threads or because in another embodiment the female threads are formed on outwardly swingable bore wall portions. These female threads are arranged in axially spaced apart sets along the bore and each set includes a plurality of thread sections, each of which extends around only a portion of the circumference of the bore. The screw member comprises a screw shank, a screw head at one end of the screw shank, and a screw thread formed on the screw shank. In use, the shank of the body member is inserted into the aligned apertures so that the head of the body member comes to rest against one of the panels. Then, the screw shank is axially slidably and non-rotatably inserted into the body member bore past the female screw thread which moves radially outward to accommodate such passage to effect leg expansion, whereby the panels are entrapped between the expanded legs and the body head. More specifically, the screw-engaging threads flex resiliently (or shift) to allow the screw thread on the screw shank to move therepast whereby the end of the screw shank engages the leg-expanding ramps to cause the legs to expand outwardly and firmly secure the body member in the panel apertures to secure the panels together. After such insertion, the female screw-engaging threads return toward their initial position and operatively engage the external male thread on the screw member to permit only rotational removal of the screw member. The screw member is disengageable from the body member by reverse rotation of the screw member whereby the male screw thread on the screw shank cooperates in the usual manner with female screw-engaging threads. Preferably, the male screw thread is discontinuous to prevent complete withdrawal of the screw member from the body bore. As the screw shank is rotatably withdrawn, the legs resume their non-expanded condition to allow axial withdrawal of the body member from the aligned apertures.

The fastener in accordance with the invention offers the following advantages over the prior art. For example, the screw-engaging threads in the body bore are constructed so as to be flexible or shiftable in one direction so as to facilitate axial sliding movement of the screw-shank threads therepast during axial insertion, but to resist such flexing or shifting in the event of attempted non-rotational axial movement of the screw threads in the opposite direction during withdrawal. Unlike the prior art, the female screw-engaging threads in the body bore are sufficiently large to make strong and firm threaded engagement with the male thread on the screw shank thereby ensuring that the body member and screw member do not separate if separating axial forces are applied in opposite directions to the two fastener components. Further, the body member is designed and constructed so that it lends itself to conventional molding techniques, yet does not sacrifice strength considerations to accommodate molding techniques and limitations. Furthermore, use of a discontinuous thread on the screw shank prevents complete separation of the body member and screw member upon rotational withdrawal of the latter thereby preventing misplacement or loss of either of the two parts prior to reuse of the fastener.

Other objects and advantages of the invention will hereinafter appear.

DRAWINGS

4,610,587

Figure 5:
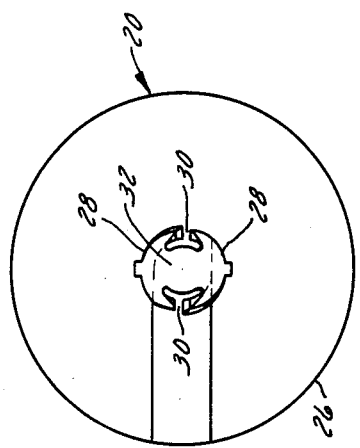
Figure 3:
Figure 1:
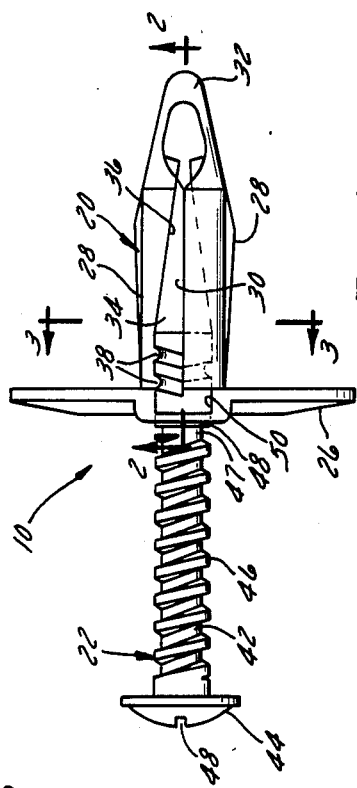
FIG. 1 is a side elevation view of a first embodiment of a fastener in accordance with the invention and showing the body member and screw member thereof in the condition in which they are molded.
Figure 2:
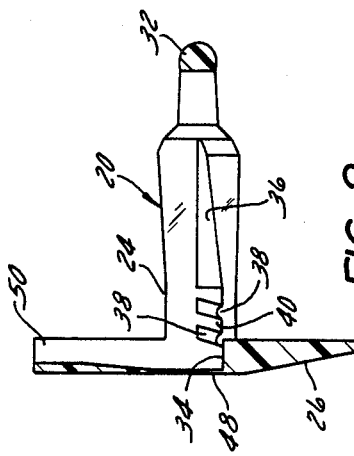
FIG. 2 is a cross-section view of the body member taken on line 2—2 of FIG. 1.
Figure 4:
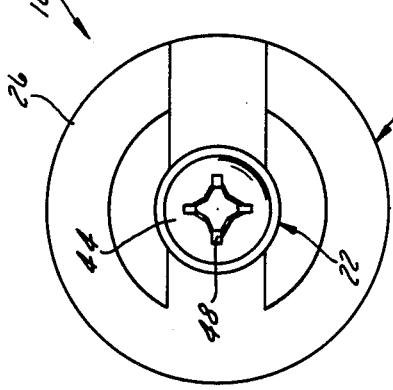
Figure 6:
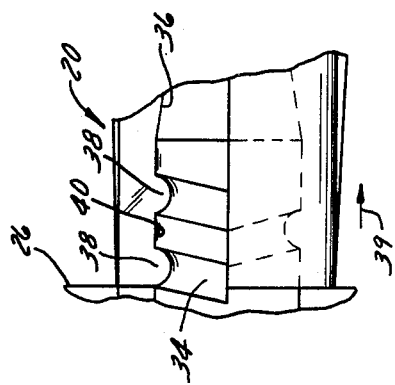
Figure 7:
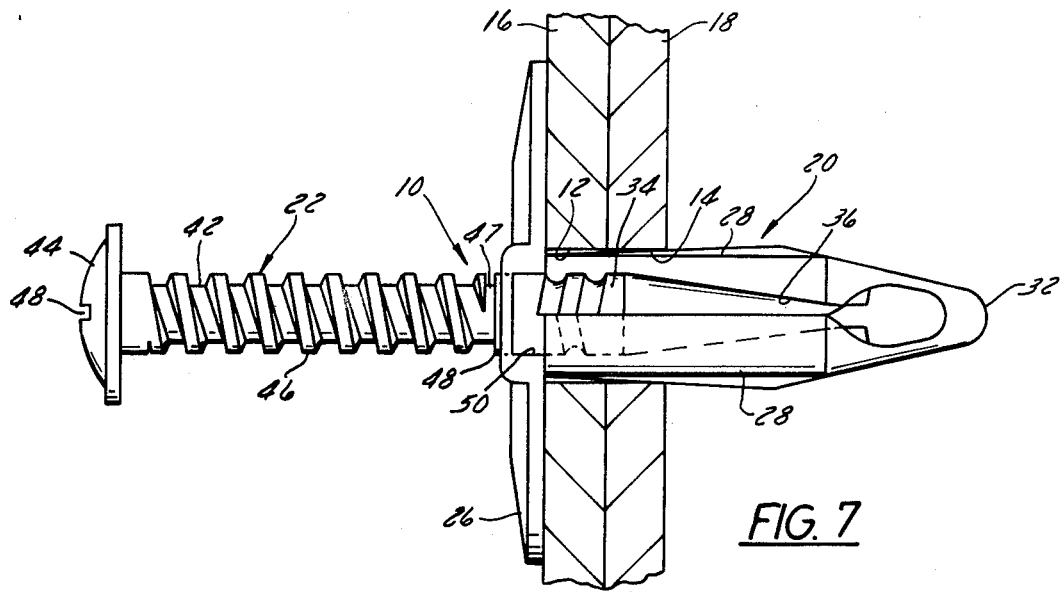
Figure 8:
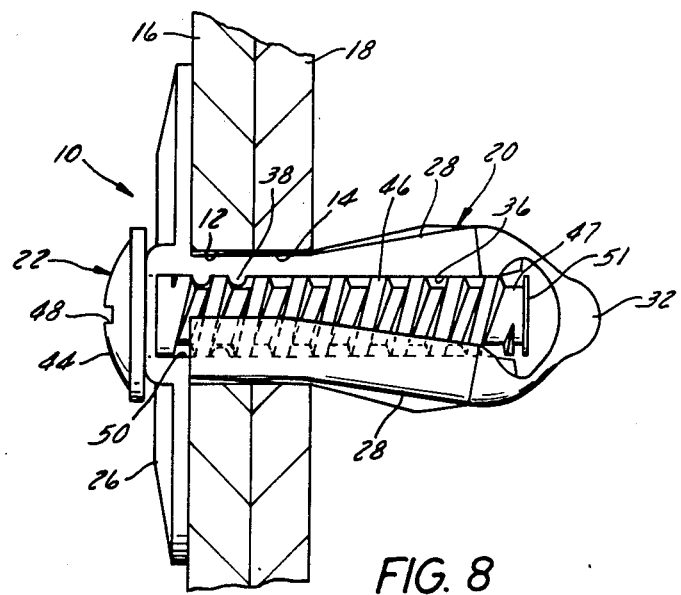
Figure 9:
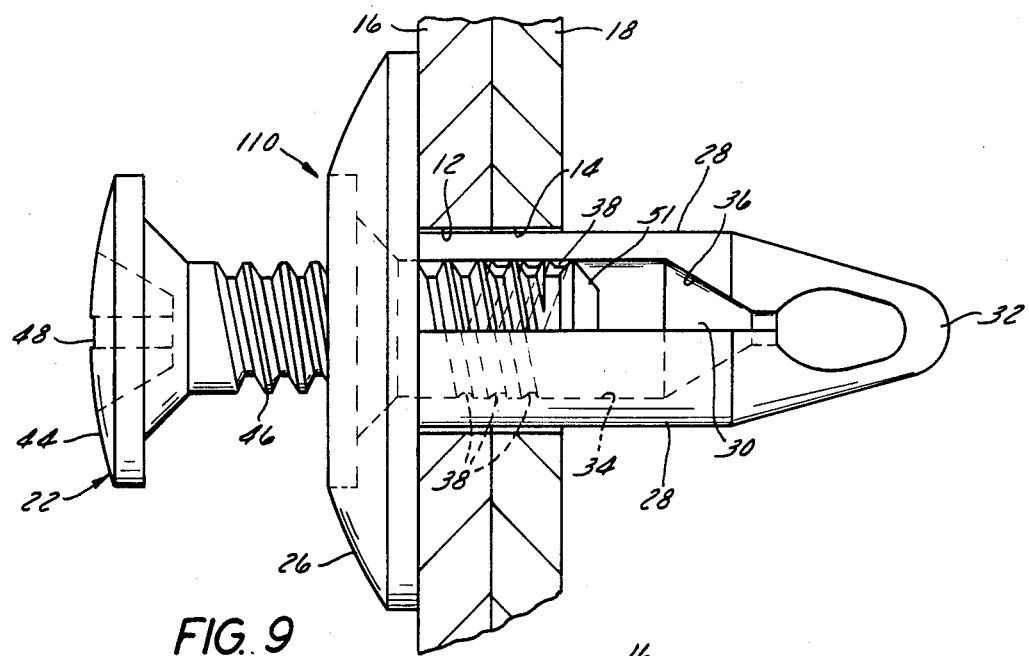
Figure 10:
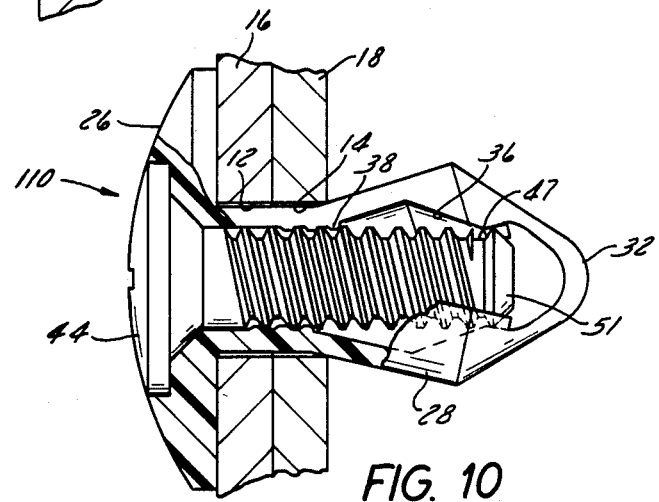
Figure 11:
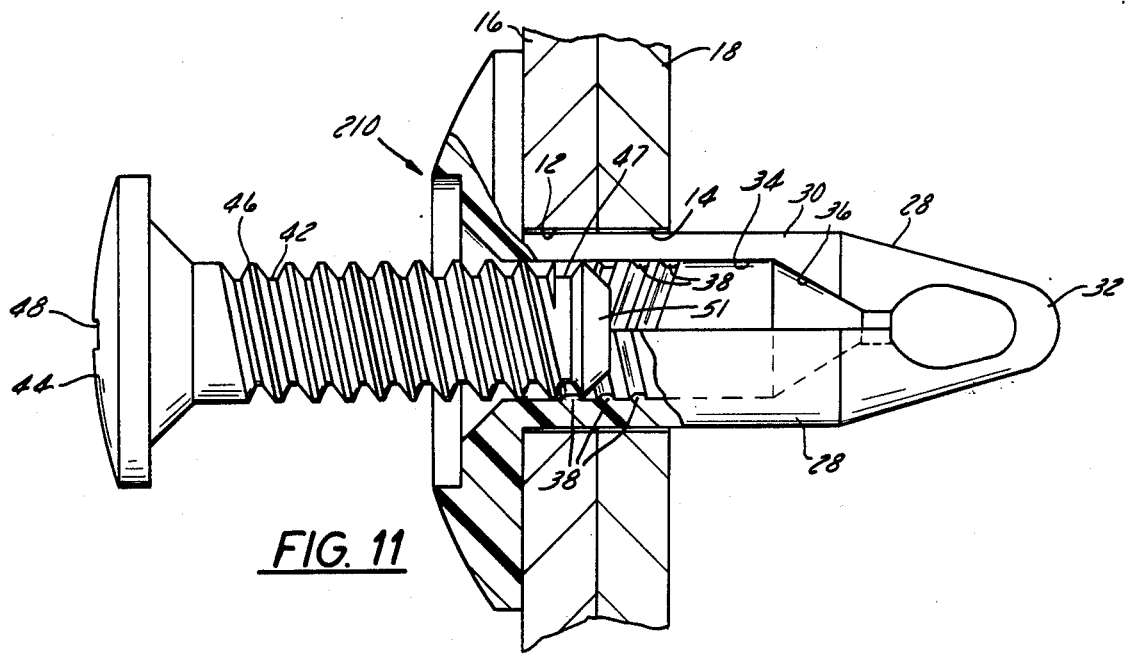
Figure 12:
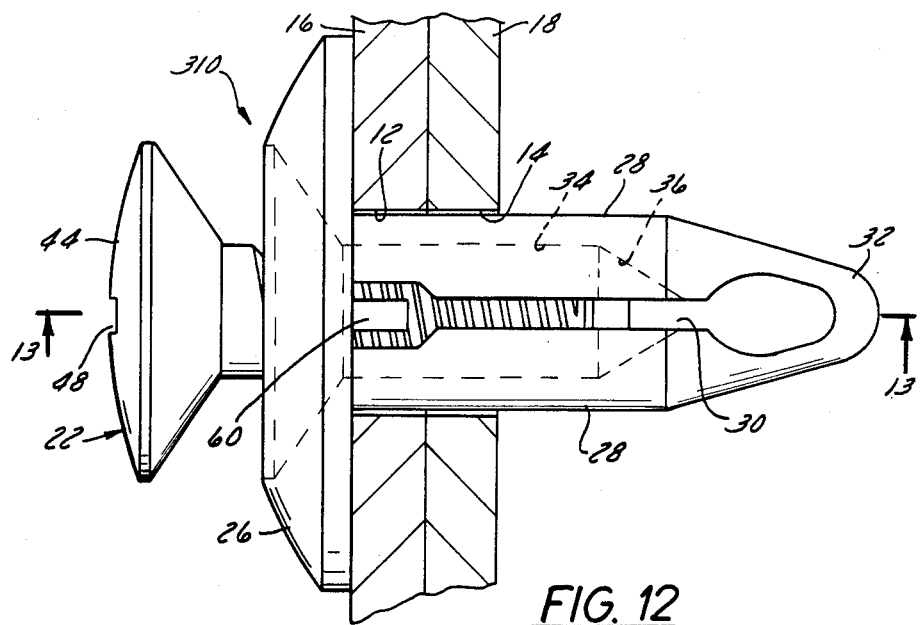
Figure 14:
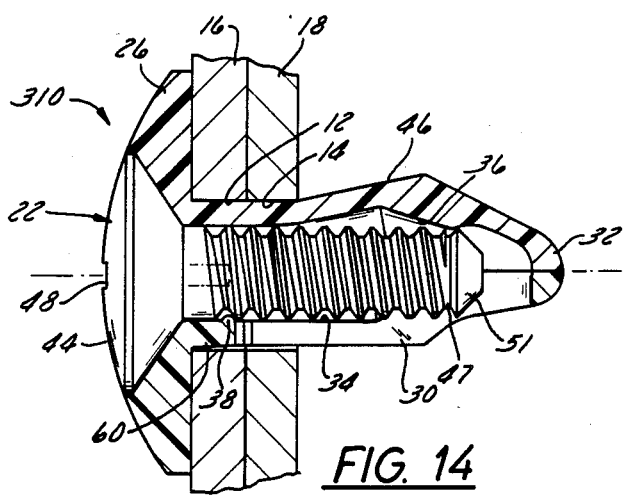
Figure 13:
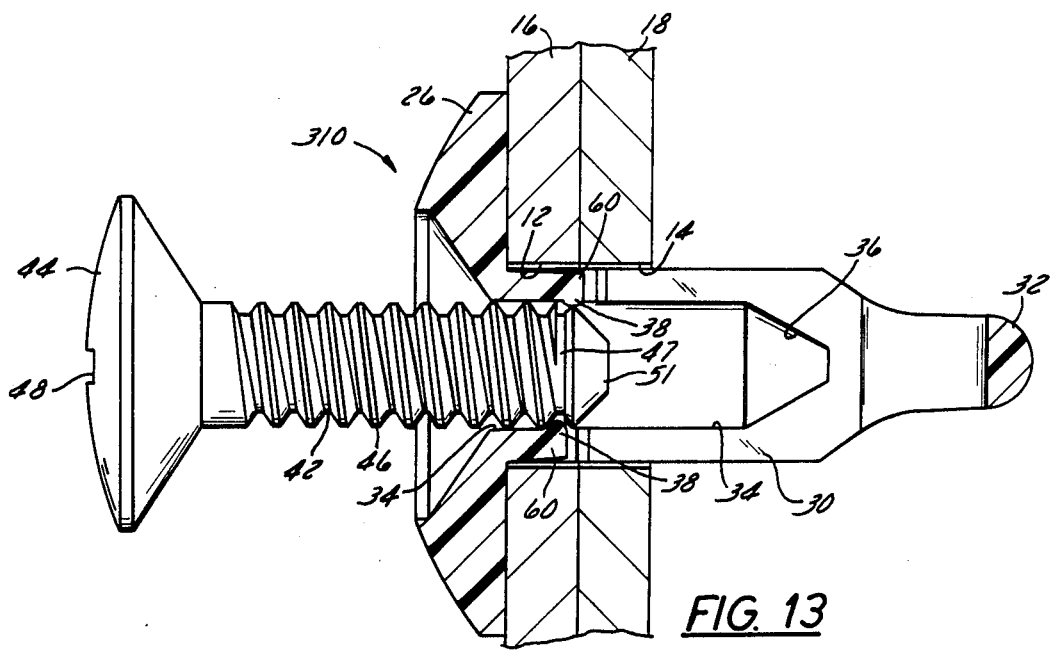
Figure 16:
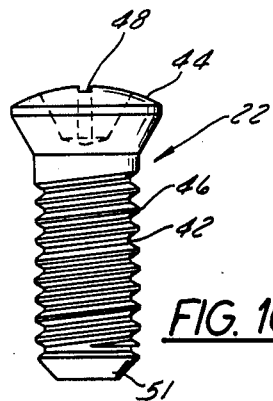
Figure 19:
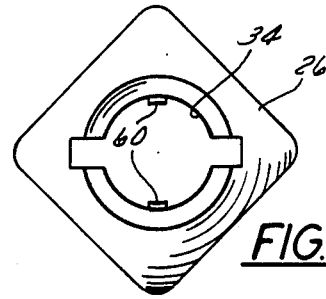
Figure 17:
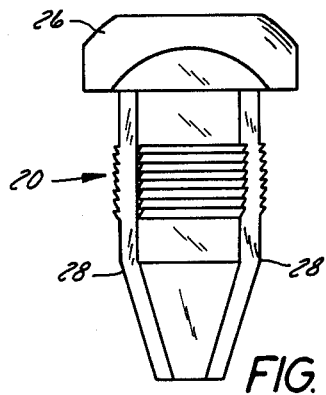
Figure 15:
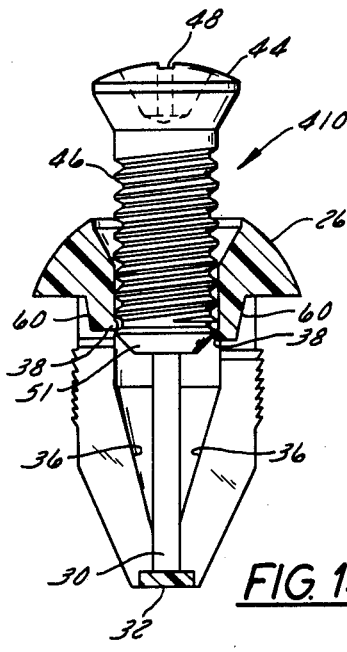
Figure 18:
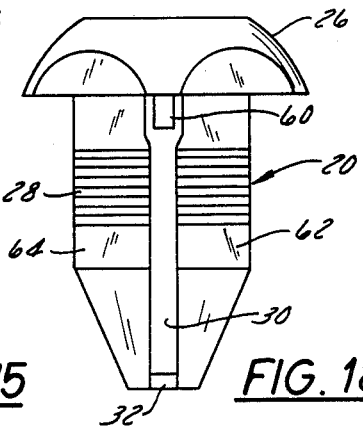
Figure 20:
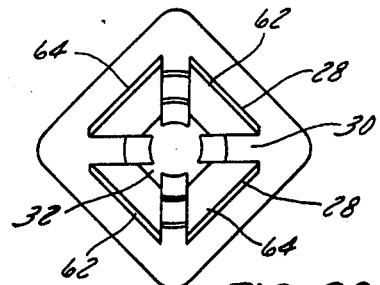

FIG. 3 is an enlarged cross-section view of the body member taken on line 3—3 of FIG. 1;

FIG. 4 is an end elevation view of the screw end of the fastener of FIG. 1;

FIG. 5 is an end elevation view of the body end of the fastener of FIG. 1;

FIG. 6 is an enlarged view of a portion of the body member shown in FIG. 1;

FIG. 7 is an enlarged view of the fastener in the condition of FIG. 1 with the screw thereof fully projecting and showing it in association with two panels which are to be secured together;

FIG. 8 is a view similar to FIG. 7 but showing the screw fully inserted into the body member and the latter fully expanded;

FIG. 9 is a view, partly in cross section, of a second embodiment of a fastener device in accordance with the invention shown in association with two panels which are to be secured together and showing the screw partially inserted;

FIG. 10 is a cross section view of the device of FIG. 9 showing the screw fully inserted into the body member and the latter fully expanded;

FIG. 11 is a view, partly in cross section, and similar to FIG. 9 but of a third embodiment of a fastener device in accordance with the invention;

FIG. 12 is a view similar to FIG. 9 but of a fourth embodiment of a fastener device in accordance with the invention;

FIG. 13 is a cross-section view taken on line 13—13 of FIG. 12 but showing the screw further retracted;

FIG. 14 is a cross-section view, in reduced scale, similar to FIG. 13, but showing the screw fully inserted into the body member and the latter fully expanded;

FIG. 15 is a side elevation view, partly in cross-section, of a fifth embodiment of a device in accordance with the invention and showing the screw partially inserted into the body member;

FIG. 16 is a side elevation view of the screw of FIG. 15;

FIG. 17 is a side elevation view of one side of the body member of FIG. 16;

FIG. 18 is a side elevation view of another side of the body member of FIG. 16;

FIG. 19 is a top end elevation view of the body member of FIG. 18;

FIG. 20 is a bottom end elevation view of the body member of FIG. 18; and

Figure 21:
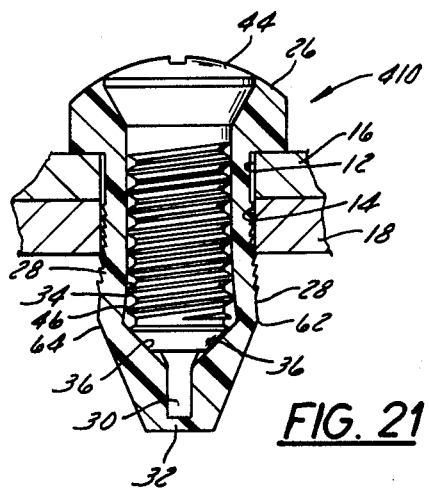

FIG. 21 is a cross-section view of the device of FIG. 15 and showing the screw fully inserted into the body member and the latter fully expanded.

DESCRIPTION OF PREFERRED EMBODIMENTS

Five embodiments of a fastener device in accordance with the invention are disclosed, depicted and described herein as follows: first, second, third, fourth and fifth embodiments designated 10, 110, 210, 310, and 410, respectively, shown in FIGS. 1-8, 9-10, 11, 12-14 and 15-21, respectively. Similar components in the several embodiments are designated by the same reference numerals.

Each of the five reusable two-piece plastic fastener devices is usable with aligned apertures 12 and 14 in a plurality of (two) panels 16 and 18, respectively, to releasably secure those panels together. The apertures 12 and 14 are all of circular configuration, except those apertures in FIGS. 15 and 21 which are of rectangular configuration.

Each of the five fastener devices comprises a hollow expandable body member 20 insertable into the aligned panel apertures 12 and 14 and a screw member 22 axially and slidably insertable into the hollow body member to effect expansion thereof and securement together of the panels 16 and 18. The screw member 22 is rotatably removable from hollow body member 20 to effect retraction of the body member 20 to enable its withdrawal from the aligned panel apertures 12 and 14 to thereby free the panels.

Each of the five fastener devices is fabricated by molding from relatively resilient, flexible and compressible plastic material, such as polyethylene or nylon, so as to enable certain portions thereof to bend or flex or compress from some initial position to another during use and then resiliently return to the said initial position. Fastener device 10 is molded so that members 20 and 22 are integrally connected initially, as hereinafter explained, but the other four fastener devices comprise discrete or separate members 20 and 22.

Each body member 20 comprises a body shank 24, a body head or flange 26 formed at one end of the shank, and a plurality of outwardly expandable or flexible legs 28 resiliently connected to the other end of the body shank. Each adjacent pair of legs 28 is separated by an axially extending slot 30 and the several legs are connected at their free ends by an integrally formed flexible hinge portion 32. A cylindrical bore 34 extends axially through body head 26 and body shank 24 and extends intermediately of the several legs 28, being in communication with the slots 30 between the legs. An inwardly sloped leg-expander ramp 36 is provided on the inner surface of each leg 28. A plurality of screw-engaging threads 38 are formed on the inner wall surface 40 of shank bore 34 and extend radially inwardly into the bore 34. The screw-engaging threads 38 in the bore 34 are constructed and arranged so as to be resiliently or flexibly movable in radial directions relative to the axis of bore 34 so as to facilitate axial sliding movement of the screw member 22 therepast during axial insertion of the screw into bore 34, but to resist or prevent axial sliding withdrawal of the screw member 22, as hereinafter explained, while permitting rotational removal of the screw member 32.

Each screw member 22 comprises a screw shank 42, a screw head 44 at one end of the screw shank 42, and a screw thread 46 formed on the screw shank 42. Screw head 44 is provided with a slot 48 to receive the tip of a screwdriver (not shown). Preferably, thread 46 is discontinuous at region 47 on screw shank 42 to prevent complete separation of the body member 20 and screw member 22 upon rotational withdrawal of the latter, thereby preventing misplacement or loss of either of the two parts 20, 22 prior to reuse of the fastener 10. However, a non-discontinuous thread 46 may be employed instead at free end 51.

As previously mentioned and as FIGS. 1 and 7 show, device 10 is fabricated of plastic material by a molding process whereby body member 20 and screw member 22 are integrally interconnected by a thin web or disc 52 of flash which is initially connected to the circumferential edge of the free end of the shank 42 of screw member 22 and to the circumferential edge around the bore 34 where the bore enters head 26 of body member 20. Device 10 is fabricated in a type of mold (not shown) which requires that the underside of body head 26 be provided with a slot or groove 50 which enables a movable component of the mold (not shown) to be withdrawn in a direction transversely away from the longitudinal axis of device 10 as the several movable components of the mold separate to release finished device 10 after it has been formed and hardened within the mold.

As previously explained, the body member 20 is molded of resiliently flexible compressible plastic. The screw-engaging internal female threads 38 are integrally formed on wall surface 40 of bore 34 and are resiliently movable radially outwardly from an initial position. Such outward movement is possible in all embodiments, except that shown in FIGS. 12, 13 and 14, because of the inherent compressibility of the female threads, or because, as in the embodiment shown in FIGS. 12, 13 and 14, the female threads 38 are formed on outwardly swingable bore wall portions 60. The female threads 38 in all embodiments are arranged in axially spaced apart sets (see FIG. 6) along bore 34 and each set includes a plurality of thread sections, as FIG. 3 best shows, each of which sections extends around only a portion of the circumference of bore 34.

Preferably, if the apertures 12 and 14 are circular, the body member 20 has a circular cross-section. However, if the apertures 12 and 14 are rectangular, then body member 20 must have a rectangular cross-section configuration on a plane transverse to the longitudinal axis thereof, as shown in FIGS. 17–20. Fastener 410 has a body member 20 which comprises two legs and wherein each leg has a pair of flat intersecting outer leg surfaces 62 and 64. The external diameter of body member 20 of fastener 310 across the region where the swingable bore wall portions 60 are disposed is less than the diameter of the aligned apertures 12, 14 to enable the bore wall portions to swing outwardly while the screw member 22 is being inserted in the bore 34.

In use, each of the five fastener devices is employed as follows. First, the shank 24 of the body member 20 is inserted into the aligned apertures 12 and 14 so that the body head 26 comes to rest against panel 16 and the unexpanded legs 28 extend from aperture 14. Then, the screw shank 42 of screw 22 is axially and non-rotatably inserted by pushing into the shank bore 34 of body member 20. In fastener device 10, as FIGS. 1 and 7 show, the screw 22 is initially secured to body 20 by the flash web 52. The screw-engaging threads 38 compress and flex resiliently to allow the screw thread 46 of screw member 22 to move therepast, whereby the free end 51 of the screw shank 42 engages the leg-expanding ramps 36 to cause the legs 28 to expand outwardly (compare FIGS. 7 and 8, 9 and 10, 12 and 14, 15 and 21) and firmly engage the body member 20 in the apertures 12 and 14 to secure the panels 16 and 18 together. The screw member 22 is disengageable from the body member 20 by reverse rotation of the screw member 22 whereby the screw threads 46 on the screw shank 42 cooperate in a conventional manner with screw-engaging threads 38 from bore 34 of body member 20. As the tip 51 of screw shank 42 of screw member 22 is rotatably withdrawn, the legs 28 resume their non-expanded condition (see FIGS. 7, 9, 12 and 15) to enable axial withdrawal of the body member 20 from the aligned apertures 12 and 14.

We claim:

1. A reusable two-piece fastener for insertion into an aperture in at least one panel and comprising a screw member and a body member:

said screw member comprising a screw shank, a screw head at one end of said screw shank, and a screw thread formed on said screw shank;

said body member comprising a body shank, a body head at one end of said body shank, a plurality of outwardly expandable resiliently flexible legs at the other end of said body shank, an integrally formed flexible hinge portion connecting the free ends of said legs, each pair of adjacent legs being separated by an axially extending slot, a bore extending axially through said body head and said body shank and intermediately of said legs, said bore being in communication with the slots between said legs, an inwardly sloped leg-expander ramp provided on the inner surface of each leg, outwardly movable resiliently flexible bore wall portions integrally formed on said body shank and located in the slots between said legs, a plurality of screw-engaging threads formed on an inner wall surface of each movable bore wall portion and extending radially inwardly into said bore, said screw-engaging threads being movable with said bore wall portions in radial directions relative to the axis of bore so as to facilitate axial sliding movement therepast of said screw thread of said screw member during axial insertion of said screw shank into said bore, each of said screw-engaging threads extending around only a part of the circumference of said bore and having the same pitch and spacing as said screw thread on said screw shank, said screw shank being axially and slidably insertable into said bore past said screw-engaging threads to engage the leg-expander ramps and effect leg expansion and entrap said one panel between the expanded legs and said body head, said screw-engaging threads being operatively engageable with said screw thread on said screw shank to prevent sliding axial withdrawal of said screw shank of said screw member and to permit only rotational withdrawal thereof from said bore.

* * * * *